(12) United States Patent
Evens et al.

(10) Patent No.: US 10,404,827 B2
(45) Date of Patent: Sep. 3, 2019

(54) CLIENT NETWORK INFORMATION SERVICE

(71) Applicant: Cisco Technology, Inc., San Jose, CA (US)

(72) Inventors: Timothy Evens, Bainbridge Island, WA (US); Serpil Bayraktar, Los Gatos, CA (US); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 15/238,811

(22) Filed: Aug. 17, 2016

(65) Prior Publication Data

US 2017/0374174 A1 Dec. 28, 2017

Related U.S. Application Data

(60) Provisional application No. 62/353,104, filed on Jun. 22, 2016.

(51) Int. Cl.
*H04L 29/08* (2006.01)
*H04L 29/06* (2006.01)

(52) U.S. Cl.
CPC ............ *H04L 67/322* (2013.01); *H04L 67/10* (2013.01); *H04L 67/16* (2013.01); *H04L 67/42* (2013.01)

(58) Field of Classification Search
CPC .. G06F 11/2025; G06F 11/1464; G06F 21/53; G06F 21/57; G06F 2201/84; G06F 2221/034; G06F 2221/0735
See application file for complete search history.

(56) References Cited

U.S. PATENT DOCUMENTS

| 8,200,971 | B2* | 6/2012 | Edwards | H04L 63/0428 713/168 |
| 8,447,881 | B2* | 5/2013 | Paramasivam | G06F 9/5033 709/203 |
| 8,516,129 | B1* | 8/2013 | Skene | H04L 45/12 370/351 |
| 9,185,006 | B2* | 11/2015 | Uluderya | H04L 67/1008 |
| 2010/0077445 | A1* | 3/2010 | Schneider | G06F 21/52 726/1 |
| 2012/0207041 | A1* | 8/2012 | Piernot | H04L 43/18 370/252 |
| 2013/0036453 | A1* | 2/2013 | Lyndersay | H04L 61/2015 726/3 |
| 2014/0207969 | A1* | 7/2014 | Benny | H04L 61/2046 709/245 |
| 2016/0070626 | A1* | 3/2016 | Raghavendra | G06F 11/2025 714/6.3 |

* cited by examiner

*Primary Examiner* — Aftab N. Khan

(74) *Attorney, Agent, or Firm* — Edell, Shapiro & Finnan, LLC

(57) ABSTRACT

Presented herein is a Client Network Information Service (CNIS). The CNIS is configured to determine client network information for a communication from a client to at least one application running in a cloud infrastructure environment. The client network information is delivered to instances of the application and to a router associated with the application in order to enable the application to adjust service for the client.

20 Claims, 8 Drawing Sheets

50

```
┌─────────────────────────────────────┐
│ DETERMINING CLIENT NETWORK INFORMATION FOR A │  52
│ COMMUNICATION FROM A CLIENT TO AT LEAST ONE  │
│ APPLICATION RUNNING IN A CLOUD INFRASTRUCTURE│
│              ENVIRONMENT                     │
└─────────────────────────────────────┘
                   │
                   ▼
┌─────────────────────────────────────┐
│ DELIVERING THE CLIENT NETWORK INFORMATION TO │  54
│ INSTANCES OF THE APPLICATION AND TO A ROUTER │
│ ASSOCIATED WITH THE APPLICATION IN ORDER TO  │
│ ENABLE THE APPLICATION TO ADJUST SERVICE FOR │
│              THE CLIENT                      │
└─────────────────────────────────────┘
```

FIG.1

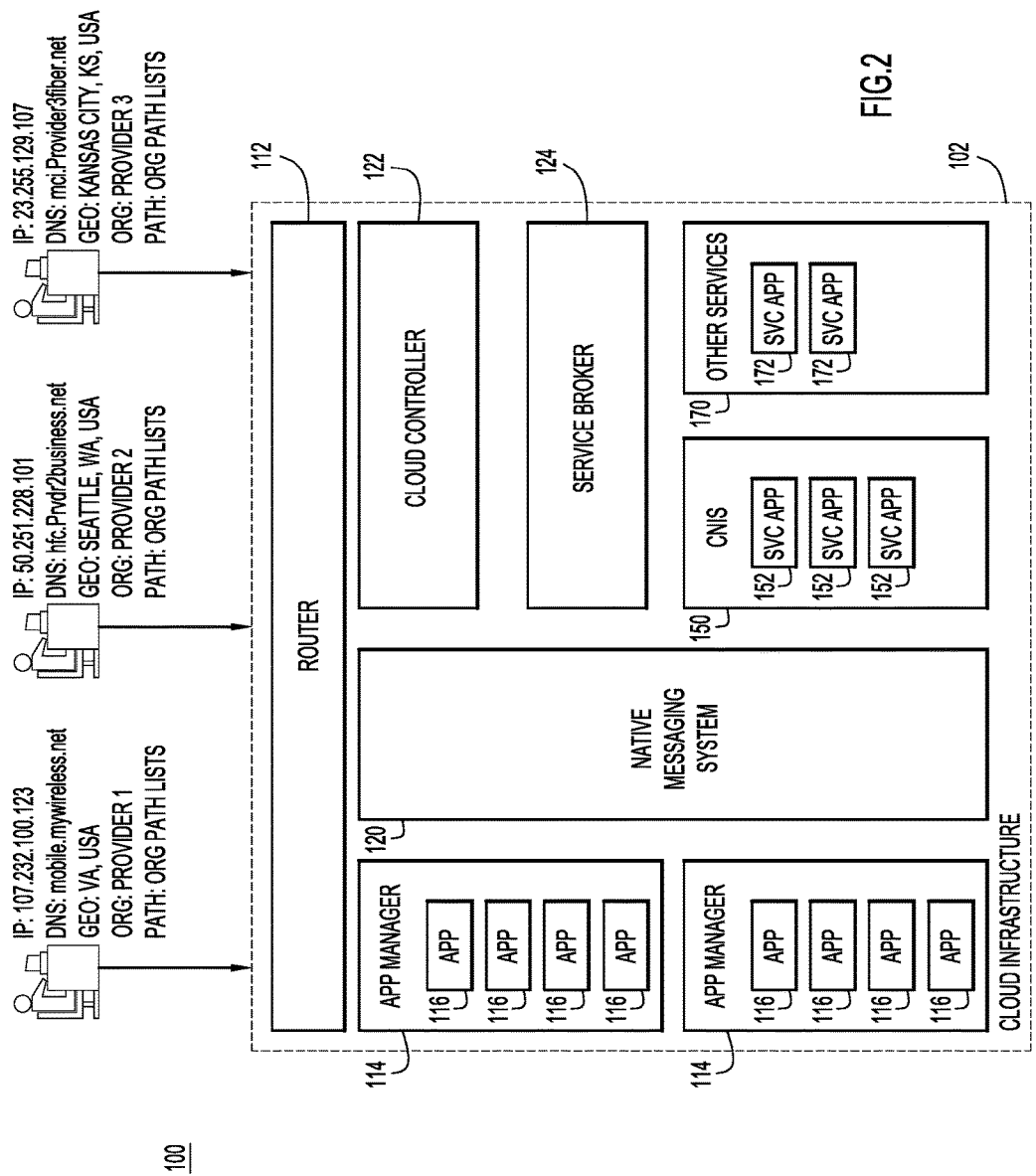

CLIENT NETWORK INFORMATION SERVICE

PRIORITY CLAIM

This application claims priority to U.S. Provisional Application No. 62/353,104, filed Jun. 22, 2016, the entirety of which is incorporated herein by reference.

TECHNICAL FIELD

The present disclosure relates to determining real-time client network characteristics for application instances that can span multiple applications and datacenters.

BACKGROUND

Infrastructure as a Service (IaaS) is a form of cloud computing that provides virtualized computing resources over the Internet. Platform as a service (PaaS) is a cloud computing model that delivers applications over the Internet. These Internet cloud services, as well as hybrid enterprise cloud/datacenters, use private or cloud provided addressing for services with client connections coming in from the Internet or from overlay/private peering networks. In some instances, microservices may also be implemented, which results in clients communicating with many application instances for even a single product (e.g. point of sale, store, portal, etc.). Regardless, IaaS, PaaS, and other frameworks that load balance server connections to server farms typically distribute loads based on the destinations and weights of loads. Some Application services use Hypertext Transport Protocol/Session Initiation Protocol (HTTP/SIP) 302 redirects to move users from one server/cluster to another based on their user profile configurations.

Due to these cloud offerings, it is common for users to move between networks while moving between different locations and still have access to any supported services (e.g., applications). For example, a user may move between an enterprise/corporate network, a coffee shop network, mobile networks, one or more Cable/DSL provider networks (e.g., at home or a friend's house), etc., over the course of a day and use any of these networks for connectivity to supported services. Some applications try to ensure that any users utilizing a specific network are using a specific server cluster and/or are directed to a caching engine geographically closest to their network/location. Meanwhile, a load balancer/router that distributes client connections may not account for a user's network/location and/or past performance quality metrics and stability of that network. Consequently, server instance selections and application service assurance are often suboptimal.

BRIEF DESCRIPTION OF THE DRAWINGS

FIG. 1 is a high-level flow chart illustrating how the Client Network Information Service (CNIS) may enhance service for an application.

FIG. 2 is a diagram illustrating how the Client Network Information Service (CNIS) may be integrated into a cloud-based load balancing solution, according to an example embodiment.

DESCRIPTION OF EXAMPLE EMBODIMENTS

Overview

Figure 3:
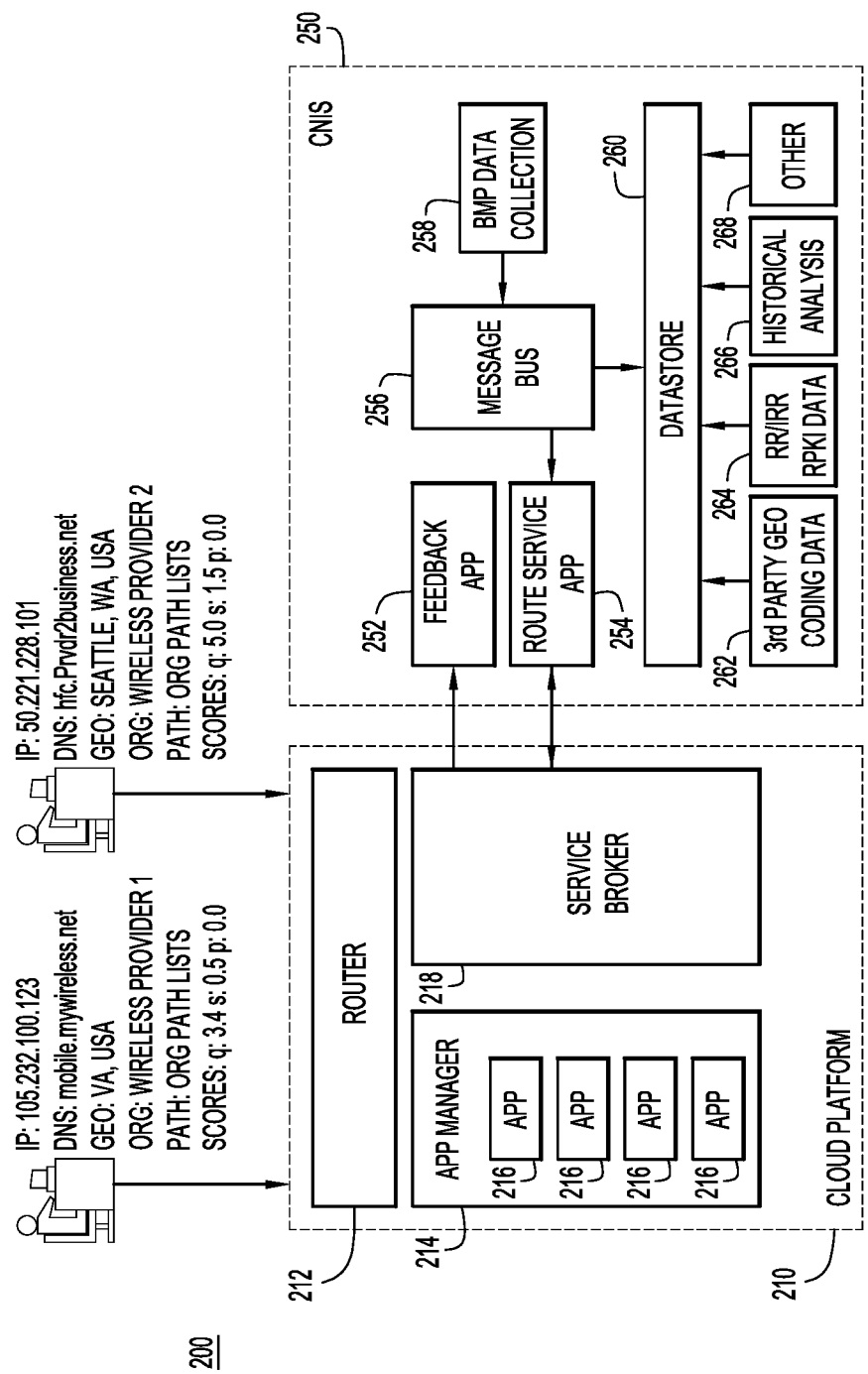
FIG. 3 is a block diagram illustrating a PaaS cloud-based route service architecture of the CNIS, according to an example embodiment.

Techniques are provided herein for a Client Network Information Service (CNIS). These techniques may be embodied as a method, an apparatus, and instructions in a computer-readable storage media to perform the method. According to one example embodiment, the CNIS is configured to determine client network information for a communication from a client to at least one application running in a cloud infrastructure environment. The client network information is delivered to instances of the application and to a router associated with the application in order to enable the application to adjust service for the client.

Example Embodiments

A Client Network Information Service (CNIS) provides applications and load balancers an extensive set of information related to a client's network status and connectivity. An application centric approach is taken by the CNIS in creating an application-network-client feedback loop, rather than a network centric approach. Consequently, applications behind load balancers/distribution routers (referred to herein interchangeably as routers, load balancers, distributors, and versions thereof), as well as the load balancers/distribution routers themselves, will be able to access and utilize client network information, including current and historical performance and stability metrics that will allow the application and load balancers/routers to provide improved server instance selection and application service assurance.

At least because of the application centric approach, the CNIS works seamlessly in many environments, such as cloud, cloud hybrid, and enterprise environments. As is discussed in more detail below in connection with FIGS. 2-4, depending upon the specific integration/implementation, applications and load balancers may receive information from the CNIS in different manners, but may use the information to achieve the same end result (e.g., improving distribution and service). For example, when the CNIS is implemented at the PaaS level, applications may be unaware that additional client information is being requested and, instead, the applications may simply receive additional information from the CNIS with a client communication. By comparison, when the CNIS is implemented at the application level, applications can request and receive information about client connections and/or communications from clients requesting connections.

Generally, the CNIS generates client network information on a per-Internet Protocol (IP) address basis. The client network information may include originating network, geographic and/or location information for the client or originating network, performance information, network path information, and other such information that allows for network correlation by client IP address. This enables load balancers/distributors (e.g., routers) to distribute loads based on network path, organization, network tagging, security/hijacking, performance, stability, etc. Additionally, the CNIS may convey information, such as client connectivity information and network information, between applications, application instances, and/or microservice instances. For example, the CNIS may provide learned real-time client network characteristics to application instances that span multiple applications and datacenters. Applications can use client network information to determine how to handle a client connection before having to undergo application processing, login, and other such operations. Applications can also use client network information to track user connections and experience. Moreover, if applications and/or services are experiencing problems, the client network information can be utilized to quickly identify a root cause and/or to isolate problems over multiple reporting applications and services.

By comparison, conventional IP identification methods, such as addressing or tagging schemes are not able to provide enough information about clients in at least cloud/PaaS environments. This results in applications being unaware of the client connectivity between instances. In other words, without the CNIS, the underlying network configuration is unknown to applications. Consequently, cloud infrastructure and platforms, as well as standalone/native applications, can provide a better experience, with better service and support.

Reference is now made to FIG. 1 for a description of a high-level method 50 performed by the CNIS to enhance application service (e.g., to provide improved server instance selection and application service assurance). Initially, at step 52, the CNIS determines client network information for a communication from a client to at least one application running in a cloud infrastructure environment. In at least some embodiments, the client network information includes scores for the client communication, such as a quality score, a security score, and a policy score. As is described in further detail below, the quality score generally represents a quality of a connection associated with the communication, the security score generally represents any security issues related to the communication, and the policy score generally represents one or more policies associated with the application. Each of the scores may be a weighted average of one or more factors, including current and past characteristics of the client communication (e.g., latency, jitter, bandwidth, etc. for the quality score), as is discussed in further detail below. Additionally or alternatively, the client network information may include network information and/or IP-related information, such as a domain name system (DNS) of an originating network for the client communication, a geographic location of the originating network, an organization of the originating network, and a network path of the communication through the originating network.

The CNIS may determine the client network information by gathering and analyzing data from a number of sources, including internal databases/datastores, sources within the cloud infrastructure, and external sources (e.g., third party databases and data feeds). For example, the CNIS may, in some embodiments, receive feedback from an application. This feedback may be analyzed to determine characteristics of a past client connections (formed subsequent to receiving a client communication) and/or to create a historical database so that the CNIS can analyze historical performance and quality of an application or client communication (e.g., the quality of a network or client associated with the client communication). As another example, the CNIS may determine client network information based on geographic data from a number of sources, including the feedback from the application, communications made via a Border Gateway Protocol (BGP) monitoring protocol (BMP), and third-party geo-coding sources. Determining this information for applications allows the applications to focus on their services without understanding the underlying network. In other words, when the CNIS is utilized, applications can offload network knowledge and need not understand BGP protocol or other such aspects of the network.

However, depending on the specific implementation, data sources may be accessed in different manners. For example, the CNIS can consume geo-coding data from internal feedback from applications as applications retrieve geo-coding from browsers, applications, etc., but depending upon how the CNIS is implemented, this data can be provided to the CNIS in different manners. The data can be provided directly to the CNIS (e.g., as shown and described in further detail below in connection with FIG. 2), provided via a feedback application (e.g., as shown and described in further detail below in connection with FIG. 3), or provided via a feedback application programming interface (API) (e.g., as shown and described in further detail below in connection with FIG. 4). Regardless, feedback data will typically be localized service geo-coding, which may allow for incremental collection of geo-coding data.

By comparison, the CNIS can consume geo-coding data from BGP communities and third-party sources, regardless of how the CNIS is implemented. BGP communities can map documented locational markings (e.g., https://onestep.net/communities/as3356/) that are discovered and learned via BMP/BGP collection. This information can then be used to geo-code prefixes. Provided that communities are tagged to prefixes, packet forwarding of prefix (host IP address) to network packet forwarding location can be identified. Known BGP next-hops and peering can also be utilized to determine where packets will be routed. The CNIS geo-codes the next-hops so that they can be used to infer the locations for all prefixes routed via those next-hops. Similarly, the CNIS can consume any geo-coding data from any third-party/external source that provides latitude and longitude, city, state/providence, country, or any other such location information. In some embodiments, geo-coding data from third-party sources are used as starting/seed data sources and enriched with BGP data and/or internal feedback data.

Notably, with regards to geo-coding data, the CNIS is focused on the route and packet forwarding distance. The CNIS is not necessarily concerned with the location of a client that is requesting an application (and, thus, the CNIS is not intended to be used for emergency services-type tracking). In other words, the CNIS does not try to track users as they move from one IP to another and, instead, focuses on correlating IP prefixes to data, such as organizations, regions, locations, routers/nodes, network points, etc. For example, a person may physically be located on Bainbridge Island, which is physically closer to Seattle than it is to Tacoma. However, selection of resources by geographical miles/km from the person will render Seattle as the best selection, even if the fiber/packet forwarding path is via Tacoma and a path through Seattle is suboptimal. The CNIS utilizes geo-coding data to determine the fiber/forwarding distance, not the physical distance. This aspect is discussed in further detail below in connection with FIG. 6.

Moreover, the CNIS normalizes geocoding data so that geocoding data from multiple sources can be easily processed. For example, in some instances, Seattle may be received as "Seattle, Wash., USA" and "Seattle, Wash., US," but may be normalized to one predetermined form (e.g., "Seattle, Wash., US"). Thus, regardless of how geo-coding data is consumed, the CNIS may use geo-coding data (e.g., BGP data) to build address family specific topologies, which can include interior (Interior Gateway Protocol) routing, Intermediate System to Intermediate System (IS-IS) routing, and Open Shortest Path First (OSPF) via BGP-Link State (BGP-LS). Root isolation nodes can also be identified by BGP next-hops, aggregators, communities, clusters, and link-state nodes. Additionally, traffic paths (e.g., the path of a client communication) may be dynamically maintained and identified by BGP next-hops, link-state, and ASN paths. However, topology, performance, and other such data are not limited to BGP or application feedback and data may also be collected from routers via telemetry feeds. Notably, since paths and root node/points in the network are do not give out sensitive information, cloud providers, service providers, and enterprises can feed BGP and telemetry data with confidence that applications will not be able to see peering IP's, router names or identifiers, etc. (and BGP peering is not required for data collection).

Once the CNIS has received/collected/consumed topology and performance data, the CNIS may perform analysis, per IP prefix, to score the reliability/stability of prefixes, next-hops, peers, link-state, etc. and to determine client-to-server and server-to-client paths. The CNIS performs analysis on network changes, registration validations, security and performance application feedback to generate various scores that can be used by applications and routers. Analysis includes, but is not limited to, root cause/common point correlation by network prefix/length, origin (e.g. ISP1, Wireless Provider1), path (e.g. Level3), geolocation (Calgary, Canada, or just Canada), stability of prefix (e.g. churning), etc.

The scores for each client connection may include, but are not limited to, scores for quality, security, and policies. Quality scores (q) may reflect the quality of the connection and may be based primarily on bandwidth, but also consider latency, jitter, packet loss, connection attempts/failures, and other such attributes. For example, in some embodiments, applications send quality reports for poor performing connections to the CNIS feedback service and a quality score is computed by weighting a combination of the aforementioned factors. In the report, the feedback may provide a rating between 0 (no issue)-10 (worst possible performance) for the quality or specific parameters of quality. In other embodiments, the score may be binary and reflect whether the aforementioned quality measurements (e.g., latency, bandwidth, jitter, packet loss) satisfy certain thresholds.

Security scores (s) can be based on prefixes (network/length), which may be monitored using Internet Routing Register (IRR) route information and Resource Public Key Infrastructure (RPKI) to determine if the IP prefix is advertised by the correct authority (ASN). Consequently, if someone attempts to hijack a prefix by overlapping or more specific advertisement, it will be detected, as is shown in the example described below in connection with FIG. 7. If the prefix is currently experiencing a possible security issue, it will be reflected in the score. In addition, the application can send a feedback report about clients based on possible security issues, such as a (distributed) DoS attack. The feedback is analyzed to correlate common points, such as origin, transit, peer, geo/location, communities, etc. The score can then be adjusted to reflect any security issues that include the client IP (prefix).

Policy scores (p) may be based on the policies of a specific application and can be determined by a configurable policy engine that allows matching of user-defined conditions and prefix attributes. Then, if matches or mismatches are detected, the score can change. For example, if an application specifies that client communications cannot be routed through a specific country or region or cannot be routed by a specific provider (e.g., not through Germany or not by a Canadian provider, respectively), the score may be updated based on the routing path and organization.

At step 54, the CNIS delivers the client network information to instances of the application and to a router associated with the application in order to enable the application to adjust service for the client. In at least some embodiments, the client network information is requested upon connection establishment. In these embodiments, the client network information is delivered to the application upon receiving a request from the application. In some of these embodiments, an application can make direct requests to request client information based on IP information (optionally including protocol and port). However, in other embodiments, an application can receive the information automatically via headers or inline messaging, and/or other similar solutions. For example, the client network information may be injected into a header of packets associated with the communication as the communication is directed to the application.

As mentioned above, the client network information may include network topology prefix/length, origin, origin and path validation, network path, geo-location (geo data), performance and security scoring, and other such information. The applications and load balancers/application routers may utilize this information to detect possible problems that effect client source IP addresses. For example, an application may review an incoming client communication (e.g., before undergoing application processing/login/etc.) based on the scores and choose to perform actions. As an example action, the application may add extra logging if the quality score is poor. The distributor could also use the scoring as a way to distribute load. For example, if a security score for particular connections is abnormal, the particular connections can be placed on a specific server instance to limit the security impact of these connections (e.g., so a denial of service (DoS) attack may only impact one instance). The scoring information can also be saved and analyzed over time to detect patterns and better handle connections over time.

Figure 4:
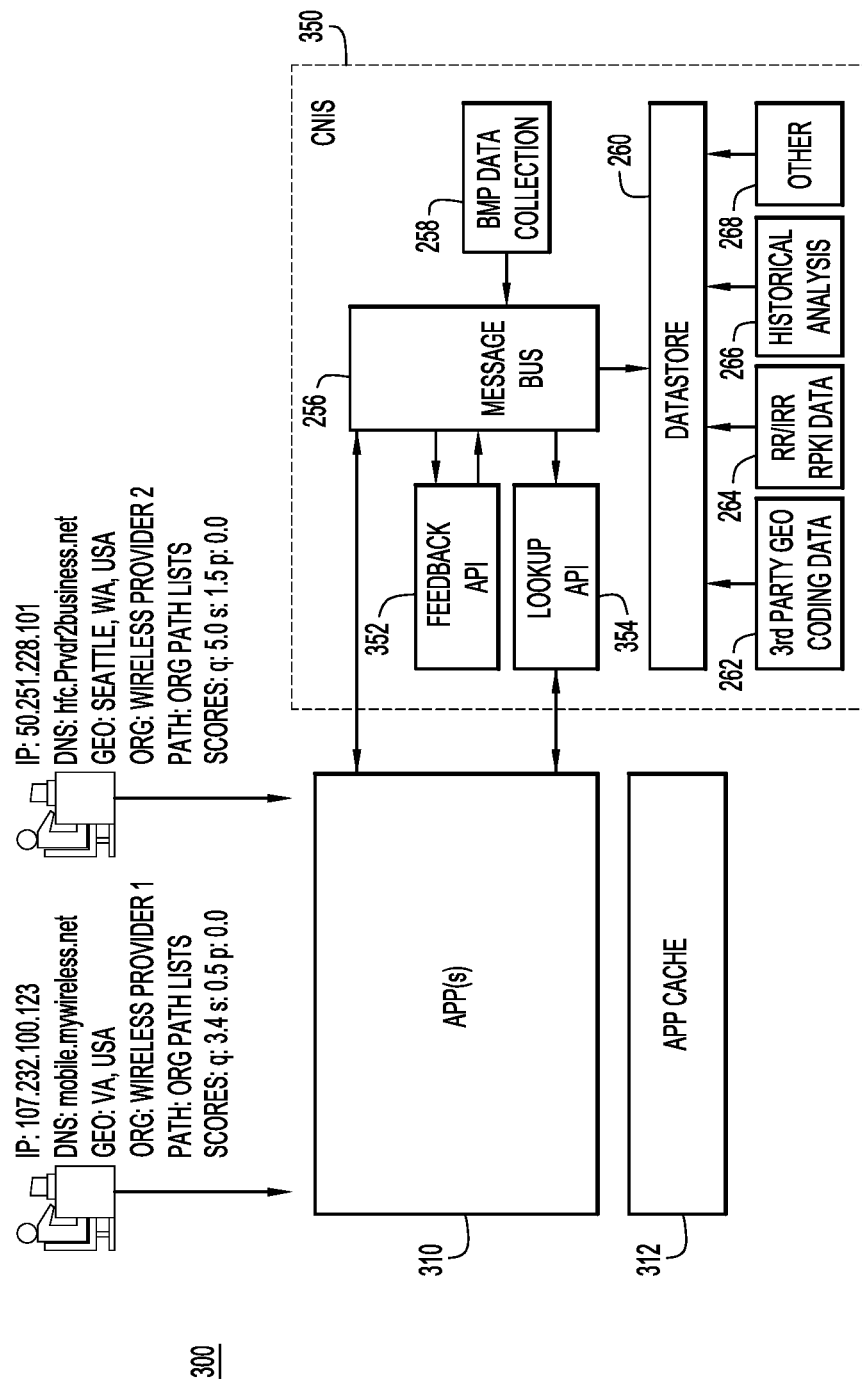
FIG. 4 is a block diagram illustrating a cloud/hybrid native application programming interface (API) architecture for the CNIS, according to an example embodiment.

Reference is now made to FIGS. 2-4 for a description of how the CNIS may be integrated into various cloud, cloud hybrid, and enterprise environments. Collectively, FIGS. 2-4 provide examples of how the CNIS may be integrated into a cloud-based load balancing solution at the platform as a service (PaaS) layer/level, the application as a service (AaaS) layer/level, or the infrastructure as a service (IaaS) layer/level, while also providing an example of how the CNIS may be integrated into a cloud/hybrid environment. More specifically, in FIG. 2, the CNIS is integrated into cloud infrastructure and, thus, included at the IaaS level. By comparison, in FIG. 3, the CNIS is implemented at the PaaS layer and acts as a service. Still further, in FIG. 3, the CNIS is integrated directly into a cloud/hybrid/native application via an application programming interface (API) architecture for the CNIS. However, these implementations are merely examples and, in other embodiments, CNIS may be integrated or implemented in any manner, including non-cloud implementations. For example, if applications are not hosted in the cloud, CNIS can provide information directly to applications because the CNIS architecture is flexible enough to handle a variety of environments. Regardless of how CNIS is integrated or implemented, CNIS may be configured to analyze geo-coding, performance, and topology data to determine network information, such as the specific forwarding path of a client communication.

Now referring specifically to FIG. 2 for a description of the block diagram 100 that depicts how the CNIS 150 may be integrated directly into a cloud infrastructure 102 at the IaaS level. In this implementation, the CNIS 150 may collect and analyze data (as is discussed above in connection with FIG. 1); however, since CNIS 150 is built into the cloud infrastructure 102, it may utilize resources within the cloud infrastructure 102 to perform these operations. Consequently, in order to improve the load balancing of applications 116 managed by one or more application manager/server 114 included in the infrastructure 102, CNIS 150 simply includes service applications 152 configured to be implemented by a service broker 124 and cloud controller 122 of the cloud infrastructure 102, similar to how the service applications 172 of other services 170 in the infrastructure 102 may be implemented.

As was mentioned above, the CNIS 150 provides additional information to both router 112 and the applications 116 in order to improve the load balancing and application performance. For example, if the cloud infrastructure 102 is utilizing a X-Forwarded-For (XFF) Hypertext Transport Protocol (HTTP) header field for identifying the originating IP address of a client connecting to a web server through an HTTP proxy or load balancer, additional fields can be added to the XFF HTTP header filed by CNIS 150. As shown next to the three example clients (e.g., from IPs 107.232.100.123, 50.251.228.101, and 23.255.129.107), example additional fields include, but are not limited to a DNS of an originating network for the client communication, a geographic location of the originating network, an organization of the originating network, and a network path of the client communication. Additionally or alternatively, the additional fields could indicate whether the IP address is possibly hijacked. Typically, the X-Forward-For header provides the source IP address to the applications, but the applications are unaware of who they are communicating with in terms of IP connectivity. In other words, without the CNIS, the applications 116 (and router 112) would only know the source IP address of client communications, not the other information shown in FIG. 2.

Once additional headers are added to provide details about the client, the application 116 may have awareness. This awareness may enable an application 116 to make application level decisions (e.g., based on different use cases) and improve service assurance/logging. Service assurance and logging enables application developers to correlate capabilities by organization/path/etc. for a client that might be having issues. For example, if users from Provider 2 are experiencing consistent video resolution downgrading due to packet loss, the application 116 may recognize and address this issue (e.g., by causing the router 112 to reroute the packets, as is explained in further detail below in connection with FIGS. 5 and 6). Additionally, the router 112 may use the path trace to aid in selecting the closest application manager to service an application request while using the organization (ORG), network path, and geographical data information for route selection for services (e.g., forward users from Provider 1 to route A, while all others are routed to route B for service url=host/path). By comparison, without the CNIS, a 302 redirect can be used to redirect client connections, but the router lacks the ability to distribute based on the client network information, such as geo-coding/location, client to server path/connectivity, etc.

Now referring specifically to FIG. 3 for a description of the block diagram 200 illustrating how the CNIS may be implemented as a service. In this example, a cloud platform 210 includes a router 212, an application manager 214 that manages a number of applications 216, and a service broker 218. The service broker 218 provides a connection to the CNIS 250 via a feedback application 252 and a route service application 254. Once or as the cloud platform 210 receives client information from the CNIS 250, headers detailing client information can be injected into traffic to applications so that the router 212 can use the CNIS headers to further classify routes. For example, the router 212 may include a header with a list of possible application manager instances and the CNIS 250 may modify the header by reordering the instances in topological order by path trace so that the router 212 can use this information when distributing/load balancing.

In this example embodiment, the feedback application 252 allows applications 216 to send feedback on clients to the CNIS 250. As discussed above, this feedback can be analyzed and used to determine characteristics of the client communication and/or to handle subsequent route service requests (thereby eliminating the need for netflow/router metrics). For example, the feedback application 252 may provide bandwidth feedback metrics (calculated per-path) that can be used in parallel or in lieu of netflow to provide real-time bandwidth by network path. However, bandwidth is not necessarily reported as real-time utilization and, instead, may be reported as "seen" bandwidth for a given time period. Thus, if feedback reports that there is packet loss on a particular path, the seen bandwidth can be analyzed to determine if there is a possible upper limit that results in packet loss. Generally, feedback information can be used to derive paths and their capabilities (e.g., performance); however, this feedback may not always be necessary to improve routing and load-balancing services.

Meanwhile, the route service application 254 may receive and analyze data from a number of sources, including BMP data received via message bus 256 from BMP data collection 258. According to at least some embodiments, the BMP data may be normalized as it is collected. For example, data may be collected in native BMP, collected in BGP and converted to BMP, or collected in multi-threaded routing toolkit (MRT) and be converted to BMP. Additionally, the route service application may receive and analyze geo-coding data 262 from third-party sources, Routing Registry (RR)/Internet Routing Registry (IRR)/Resource Public Key Infrastructure (RPKI) data 264, historical analysis 266, or other such data 268 that is stored in datastore 260.

Now referring to FIG. 4 for a description of a block diagram 300 illustrating how the CNIS may be integrated directly into an application 310, whether the application is hosted in a cloud, hybrid, or enterprise environment. In this implementation, the CNIS 350 may collect and analyze the same data as CNIS 250 (and thus includes similar features, such as datastore 260 and message bus 256); however, CNIS 350 now includes APIs to interface directly with an application. In particular, CNIS 350 includes a feedback API 352 and a lookup API 354. Application(s) 310 can send requests to lookup API 354 based on client connections (e.g., representational state transfer (REST)/Grid Remote Procedure Call (GRPC)) while feedback communication is communicated via message bus 256 (e.g., Kafka) topics. For example, the application(s) 310 may send feedback requests based on client connection performance, location, and characteristics. Additionally, the application(s) 310 may have a local cache 312 of frequently used prefixes to support microsecond lookups. Consequently, the local cache 312 can be updated in real-time via the feedback API 352. Software development kits for Java, C/C++, Python, and Go can provide easy and turn-key application integration.

Now referring to FIG. 5 for a description of a block diagram 400 illustrating an example use case of the cloud platform 210 while implementing CNIS 250 in the manner shown and described in connection with FIG. 2. In this example, four connections to an application (APP 1) hosted on the cloud platform 210 are illustrated. Connection 402 is from a place of business, connection 404 is from a mobile device, connection 406 is from a coffee shop (or other public location), and connection 408 is from a plane. Each time a client device utilizes one of these connections to APP1, APP1 receives the user source IP, DNS pointer (PTR), and user profile information. The CNIS supplements this information with information about the user's network/IP address, including the DNS of an originating network for the client communication, a geographic location of the originating network, an organization of the originating network, and a network path of the client communication. Consequently, if the application records degraded performance due to packet loss or any other problem, the application may quickly identify the particular path and/or service provider that are causing the problem. Without CNIS information, an application may not be able to correlate users from different organizations and, thus, may not know if there is a common network related problem.

Figure 5:
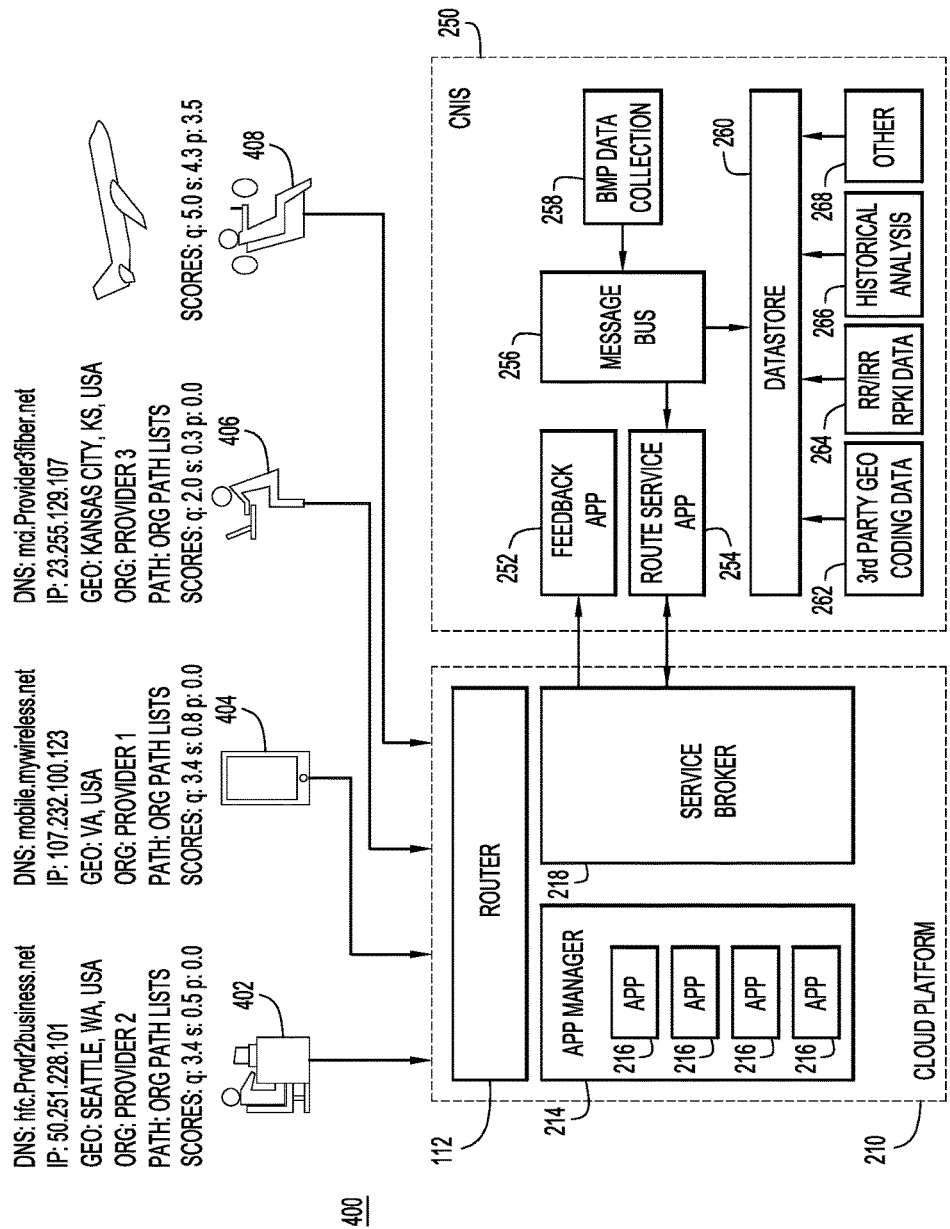
FIG. 5 is a diagram illustrating cloud-based load balancing of traffic to applications with the use of the CNIS, according to an example embodiment.

More specifically, in the example depicted in FIG. 5, the CNIS has determined that connection 402 is from an originating network with a DNS of hfc.Prvdr2business.net, a geographic location of Seattle, Wash., USA, and hosted by Provider 2. Also connection 402 has a specific network path maintained in Org Path Lists, and has a quality score of 3.4, a security score of 0.5, and a policy score of 0.0. The CNIS has also determined that connection 404 is from an originating network with a DNS of mobile.mywireless.net, a geographic location of VA, USA, and hosted by Provider 1, has a specific network path maintained in Org Path Lists, and has a quality score of 3.4, a security score of 0.8, and a policy score of 0.0. For connection 406, the CNIS has determined that the originating network has a DNS of mci.Provider3fiber.net, a geographic location of Kansas City, Kans., USA, and is hosted by Provider 3. Connection 406 is also determined to be on a specific path maintained in Org Path Lists, and has a quality score of 2.0, a security score of 0.3, and a policy score of 0.0. Finally, the CNIS not determined specific IP and network information for connection 408, but has determined a quality score of 5.0, a security score of 4.3, and a policy score of 3.5.

The application being requested via each of these connections (APP1) can consume this data and enhance the service selection/optimization, improve service assurance by logging client network information, improve identity validation by knowing where the client is coming from at the network level and how they reached the service, and otherwise enhance the application service. For example, the CNIS may remedy deficiencies associated with APP1 if APP1 is attempting to ensure that users on a specific network use a specific cluster. However, in this specific example, connection 402 is routed to a corporate instance of APP1 (APP1 Corporate), connection 404 is routed to a mobile instance of APP1 (APP1 Mobile), connection 406 is routed to a public instance of APP1 (APP1 Coffee shop), and connection 408 is routed to a LowPerf instance of App1 (APP1 LowPerf).

If any of the client network information changes or indicates a problem, these connections could be routed to specific instances based on the scores, geographical data, or any other client network information. For example, as more connections are made and issues are detected, the issues can be easily isolated. As a more specific example, if a user access APP1 from their office (e.g., on connection 402) without issue, but experienced problems at a coffee shop (e.g., on connection 406), the application can easily identify the origin of the communication (in this case simply based on the instance being used). The problem can be compared to other connections on the same instance to determine if the problem is with the instance or the specific connection and the problem can also be correlated with other problematic connections to isolate the cause. If all poor performing connections are in a specific region (e.g., US-WEST), the path to the application may be the source of the poor performance (since the path that the user takes to get from Provider 3 to the service goes through a common set of transit providers). Consequently, the CNIS dramatically reduces the time to isolate a problem.

Once a problem is identified, the connection can be rerouted to increase performance. In some embodiments, the application may issue a query to the CNIS for an alternate path that could workaround the problem, such as find me another server instance/cluster of mine that does not use the same path. The CNIS can identify that the common problem path is Provider 3 to Provider X to Cloud Provider, and that an alternate path of Provider 3 to Provider Z to Cloud Provider can be utilized if a different server instance were to be selected. Additionally or alternatively, if one or more server instance reports many connections being made, causing connections to be invalid/impossible, CNIS may correlate these reports to identify a possible Denial of Service (DoS) attack. CNIS may then identify that all invalid connections are from five specific server instances and dynamically instruct the router to distribute those subnets to a specific server instance (or deny the connections), thereby freeing up at least some (if not all) server instances.

In other cases, an application deployment may have several clusters of servers all of which have the same Uniform Resource Locator (URL). In order to provide a service level agreement (SLA) when the customer uses their network where special arrangements have been made, a specific cluster needs to be used when they come from their network (e.g., APP1 Corporate). When the customer logins from a network outside the scope of the SLA, the customer gets placed on general population servers. For reporting purposes, the client network used is logged to track SLA included connections verses non-SLA connections. With the CNIS, the router may be configured to distribute connections from clients to server instances based on client network origin and the policy score that may account for the SLA.

In still other cases, a media service deployed in a cloud environment receives Web Real-Time Communication (WebRTC) connections based on a common URL. The receiving WebRTC application can redirect the user to a more appropriate server based on their location, bandwidth requirements and current loads. The application uses CNI to identify the client network origin and network path in order to determine which server the user should be using for the current connection. The application then redirects the user to the appropriate server instance based on their network origination, path, and location.

Figure 6:
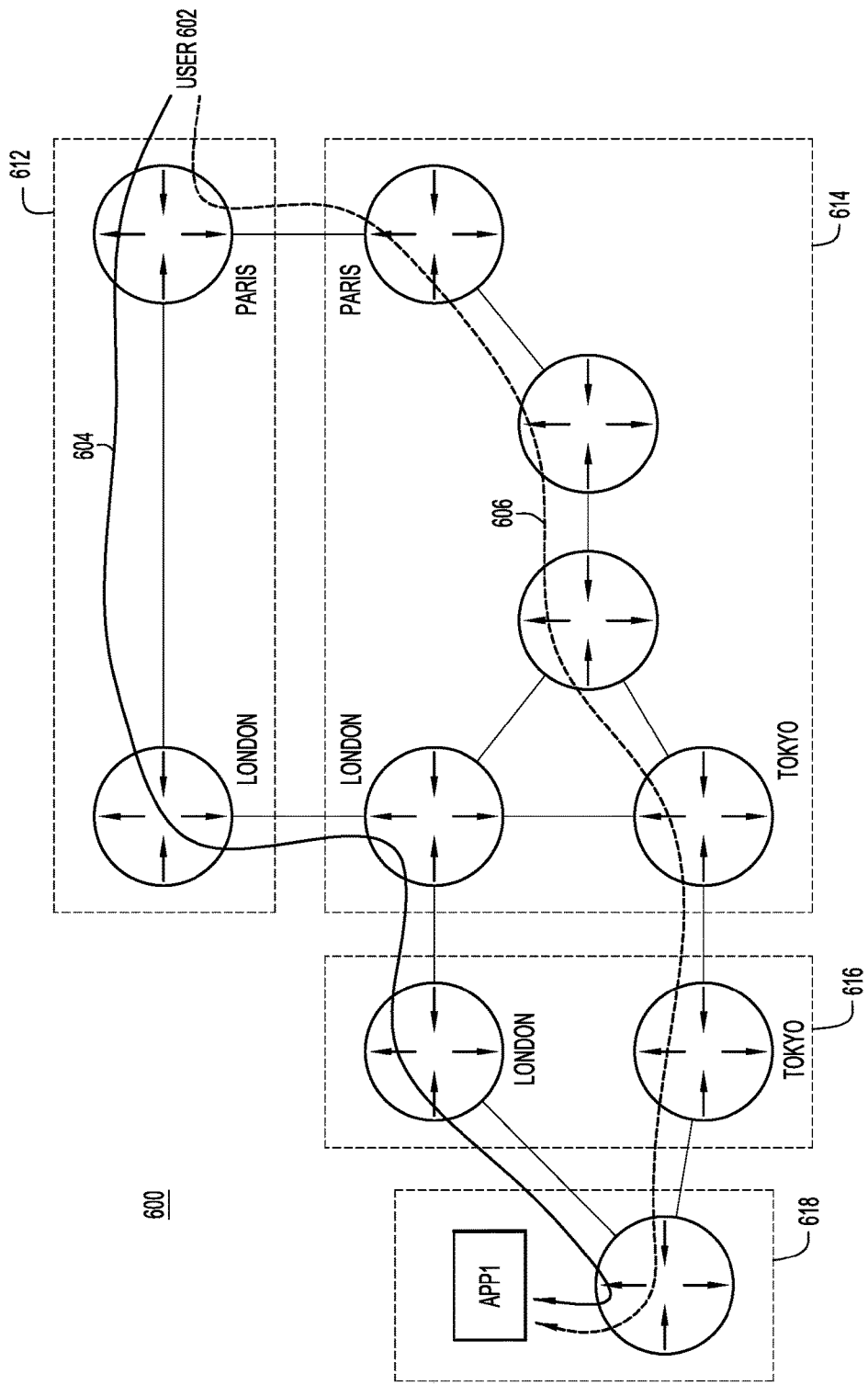
FIG. 6 is a diagram illustrating how geographic and organization paths are used by the CNIS, according to an example embodiment.

Now referring to FIG. 6 for a description of a block diagram 600 depicting how geographic and organization paths are used by the CNIS, according to an example embodiment. In this example, an established stream (e.g., Transmission Control Protocol (TCP)) between a user 602 and changes after initial setup to resolve a connection problem. Initially, user 602, who is in Paris, is connected to APP1 via path 604, which goes through ASN 612, ASN 614, and ASN 616, before arriving at APP1, which is disposed in ASN 618. Notably, each of ASN 612, ASN 614, and ASN 616 include physical locations in London. However, if this connection is creating performance issues, the path can be shifted to path 606 during the life of the connection/stream. No TCP connection changes occurred between APP1 and user 602. This shift moves the connection through Paris and Tokyo instead of London, without changing the ASN path. In fact, as far as APP1 and user 602 are concerned, the connection is still the same, even though the connection was re-routed away from London to Paris via Tokyo. In this example, user 602 and APP1 may notice increased latency and jitter, but do not know why since the connection has not changed from their perspective. CNIS addresses this gap in visibility by informing APP1 that the path has changed from London to Paris via Tokyo. If a policy rule was in place to ensure the path stays local via London, the policy score would have been updated to indicate that the path is in violation now. Regardless, APP1 is now aware of the path changes to existing streams/connections, even if there are no direct connection changes.

Figure 7:
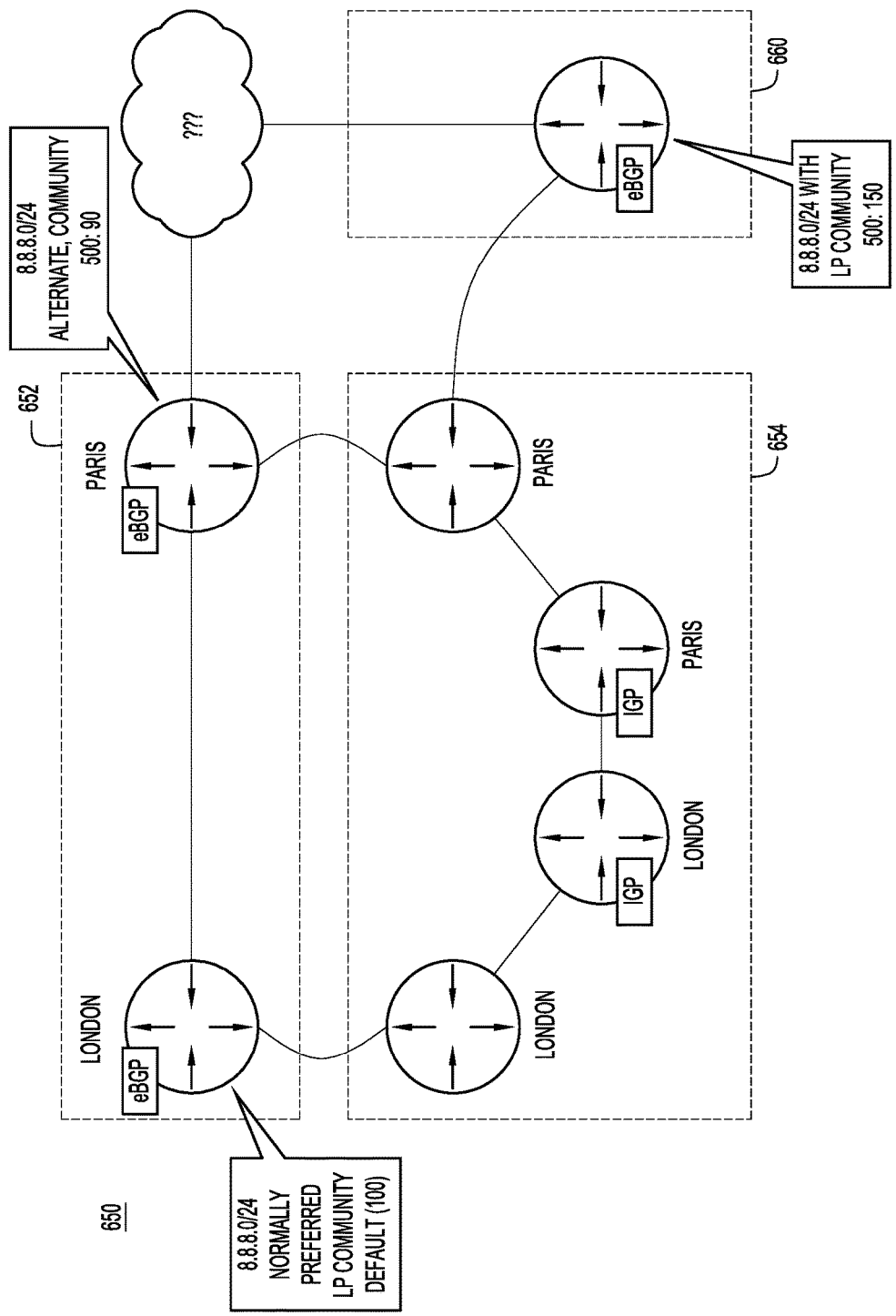
FIG. 7 is a diagram illustrating how client network information may be used by the CNIS, according to an example embodiment.

Now referring to FIG. 7 for a description of block diagram 650, which illustrates how the CNIS may utilize network information to detect network problems. In this particular example, the CNIS detects a route leak; however, this is only one example and the CNIS may also detect other network problems or attacks, such as DoS attacks, as is described above. In block diagram 650, a route path travels through ASN 652 and ASN 654. Typically, ASN 652 is advertised in the 8.8.8/24 prefix. However, the CNIS can detect that this prefix is coming from another customer, in ASN 660. Since ASN 652 is still in the path, the new customer in ASN 660 is likely a transit (e.g., a man-in-the-middle), which is a security problem.

Figure 8:
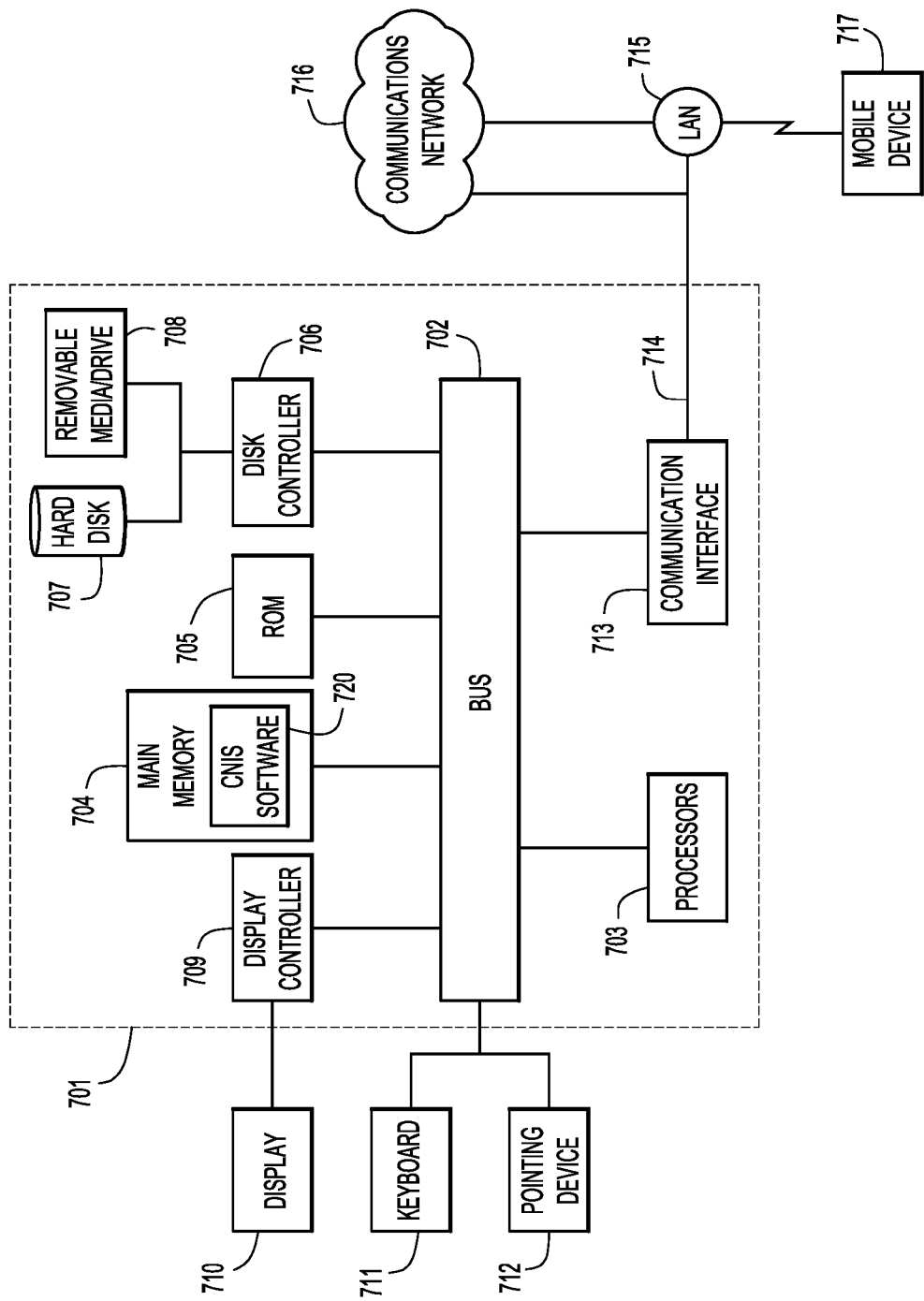
FIG. 8 is a block diagram of a computing apparatus configured to perform the CNIS operations presented herein, according to an example embodiment.

FIG. 8 illustrates an example hardware diagram of a computing apparatus 701, such as a server, on which the CNIS may be implemented. The apparatus 701 includes a bus 702 or other communication mechanism for communicating information, and processor(s) 703 coupled with the bus 702 for processing the information. While the figure shows a signal block 703 for a processor, it should be understood that the processors 703 represent a plurality of processing cores, each of which can perform separate processing. The apparatus 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors, may individually or collectively, act as processing circuitry. The processing circuitry may be located in one device or distributed across multiple devices.

The apparatus 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor(s) 703. The memory 704 stores CNIS software 720 that, when executed by the processor(s) 703, enables the computing apparatus 701 to perform the operations described herein. In addition, the main memory 704 may be used for storing temporary variables or other intermediate information during the execution of instructions by the processor 703. The apparatus 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The apparatus 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the apparatus 701 using an appropriate device interface (e.g., small computer system interface (SCSI), integrated device electronics (IDE), enhanced-IDE (E-IDE), direct memory access (DMA), or ultra-DMA). Thus, in general, the memory may comprise one or more tangible (non-transitory) computer readable storage media (e.g., a memory device) encoded with software comprising computer executable instructions and when the software is executed (by the processor) it is operable to perform the operations described herein.

The apparatus 701 may also include a display controller 109 coupled to the bus 702 to control a display 710, such as a cathode ray tube (CRT), for displaying information to a computer user. The computer system 701 may also include input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the apparatus 701.

The apparatus 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the apparatus 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the apparatus 701, for driving a device or devices for implementing the invention, and for enabling the apparatus 701 to interact with a human user (e.g., network engineers). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The apparatus 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the apparatus 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The apparatus 701 can transmit and receive data, including program code, through the network(s) 715 and 716, the network link 714 and the communication interface 713. Moreover, the network link 1214 may provide a connection through a LAN 715 to a mobile device 717 such as a personal digital assistant (PDA) laptop computer, or cellular telephone.

The techniques presented herein provide a number of advantages. As one example, due to its flexibility and ability to normalize data, the CNIS can use Application Layer Traffic Optimization (ALTO) as a source of data for network provider points. ALTO focuses on traffic optimization by providing a network map of provider identifications to endpoints. This produces a cost map which can be used to get provider specific costs from a source to a set of possible resources (destinations). The information provided in an ALTO server is obtained by a combination of sources, but primarily comes from the network department of a specific provider. The provider can be an enterprise, service provider, ISP, a cloud provider, but in either case there are multiple providers representing themselves. This renders provider specific views of the network. This is valuable information, but ALTO server reachability may be restricted and the feasibility to talk to N number of ALTO servers poses a complex scale problem for an application while also having a high potential to provide conflicting information. For example, if an application connects to an ALTO server from a first service provider and gets a cost map Y, but a second application can only connect to an ALTO server from a second service provider (not the first service provider), the two applications may have different cost maps.

The complexity for the micro-service applications to deal with multiple ALTO servers is mitigated using CNIS. CNIS normalizes the ALTO data for applications while also providing services to applications with or without ALTO. The CNIS resource selection includes more than what ALTO provides or has in scope, such as the application feedback, scoring, real-time updated quality, geo-coding, etc. ALTO is hop-by-hop provider aware cost mapping, while the CNIS is a global IP client address informational service that takes into account the hop-by-hop and lack thereof information, regardless of a resource selection or traffic optimization request. The CNIS also provides Internet and private/interdomain prefix lookup/tracking with application feedback to enrich the data.

Moreover, since the CNIS may run as a hosted service for a cloud/enterprise and/or as a service within the service framework of applications (e.g., side by side), the CNIS may be owned and operated by the service application owners. This enables the CNIS to comply with privacy and security concerns that ALTO does not address because ALTO is run by the network providers instead of the application developers/integrators. The CNIS takes data feeds from public and private/commercial sources and implements data analytics to generate meaningful client information, instead of providing provider-specific maps.

As another example advantage, due to its flexibility, the CNIS can be implemented with network access and/or policy enforcement security techniques. For example, if a security technique labeling IP connections on the edge with security group tags (SGT) to classify connections (so that the classifications can be used for policy enforcement), CNIS can enhance the tags with characteristics and information about IP prefixes based on real-time adaptive learning. As a more specific example, virtual private networks (VPNs), which typically add SGTs statically based on user group/logins, can be enhanced to use the CNIS to add SGTs based on far more than the user's login information. Then, the VPN concentrator could feedback performance to the CNIS so that all VPN concentrators are aware of connectivity paths. Consequently, instead of simply selecting a particular concentrator for a particular user, path changes or unstable paths can be detected and the concentrators will be able to adapt based on the CNIS provided information. SGTs can then be updated as needed based on CNIS data. By comparison, without the CNIS, a user may continue to use a specific path to connect to even if it is suboptimal. For example, a user could be routed through San Jose even when visiting Finland if the concentrator normally tags this connection for San Jose with little regard to where a user is really located or how well performance is between San Jose concentrator and the wireless provider.

More generally, the CNIS provides advantages by determining client network information (e.g., by correlating IP/Network information with client IP addresses) and providing this client network information to applications and load balancers (e.g., routers). The CNIS caters to applications by providing them in-depth information about client connections. Consequently, PaaS and standalone/native applications can provide better service, experience, and support by having network information about their clients. The client network information enables load balancers/distributors the ability to consider network path, organization, network tagging, security/hijacking, performance, stability, and other such factors, which, in turn, enables the load balancer to distribute loads more efficiently. The client information also conveys information between applications (e.g., microservice application) to allow the applications to consider client connectivity and network information when providing services and to determine how to handle the connection before having to undergo application processing, login, and other such operations. Applications can also use client network information to track user connections and experience. Moreover, the CNIS also allows the root cause of a problem (or a problem itself) to be quickly identified over multiple reporting applications and services. The CNIS is also advantageous because seamlessly works in many environments, such as cloud, cloud hybrid, and enterprise environments.

To summarize, in one form, a method is provided comprising: determining client network information for a communication from a client to at least one application running in a cloud infrastructure environment; and delivering the client network information to instances of the application and to a router associated with the application in order to enable the application to adjust service for the client.

In another form, a system is provided comprising: a cloud-based infrastructure hosting one or more applications and having connectivity to a network; and a client network information service having connectivity to the one or more applications and being configured to: determine client network information for a communication from a client to at least one application running in a cloud infrastructure environment; and deliver the client network information to instances of the application and to a router associated with the application in order to enable the application to adjust service for the client.

In yet another form, a non-transitory computer-readable storage media encoded with software comprising computer executable instructions is provided and when the software is executed operable to: determine client network information for a communication from a client to at least one application running in a cloud infrastructure environment; and deliver the client network information to instances of the application and to a router associated with the application in order to enable the application to adjust service for the client.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining, at a computing apparatus, client network information for a communication from a client to at least one application running in a cloud infrastructure environment, wherein:
   the client network information: is determined on a per-Internet Protocol address basis; includes a network status of an originating network for the communication and connectivity information related to the originating network and the communication; and includes one or more of: a quality score representing a quality of a connection associated with the communication, a security score representing any security issues related to the communication, and a policy score representing one or more policies associated with the application; and
   the determining comprises: analyzing geographic data obtained from at least one of: the application, communications made via a Border Gateway Protocol (BGP) monitoring protocol, and third-party geo-coding data; and analyzing historical performance and quality of the communication based on past feedback from the application; and
   automatically delivering the client network information to instances of the application and to a router associated with the application by injecting the client network information into a header of packets associated with the communication as the communication is directed to the application, wherein the injecting causes selection of an instance of the application that provides service assurances.

2. The method of claim 1, wherein the automatically delivering comprises automatically delivering the client network information to the application upon receiving a request from the application.

3. The method of claim 1, wherein the client network information indicates a domain name system of the originating network for the communication, a geographic location of the originating network, an organization of the originating network, and a network path of the communication.

4. The method of claim 1, wherein the injecting of the client network information causes the selection by modifying the header with an ordered list of possible application instances.

5. The method of claim 1, wherein the analyzing of the geographic data determines a forwarding distance of the communication.

6. The method of claim 1, further comprising:
   normalizing the geographic data prior to the analyzing of the geographic data.

7. The method of claim 1, wherein at least one of the quality score, the security score, and the policy score is a weighted average of one or more factors.

8. A system comprising:
   a cloud-based infrastructure including one or more computing apparatuses, hosting one or more applications and having connectivity to a network; and
   a client network information service having connectivity to the one or more applications and being configured to:
   determine client network information for a communication from a client to at least one of the one or more applications, wherein:

the client network information: is determined on a per-Internet Protocol address basis; includes a network status of an originating network for the communication and connectivity information related to the originating network and the communication; and includes one or more of: a quality score representing a quality of a connection associated with the communication, a security score representing any security issues related to the communication, and a policy score representing one or more policies associated with the application; and a determination of client network information comprises: analyzing geographic data obtained from at least one of: the application, communications made via a Border Gateway Protocol (BGP) monitoring protocol, and third-party geo-coding data; and analyzing historical performance and quality of the communication based on past feedback from the application; and automatically deliver the client network information to instances of the application and to a router associated with the application by injecting the client network information into a header of packets associated with the communication as the communication is directed to the application, wherein the injecting causes selection of an instance of the application that provides service assurances.

9. The system of claim 8, wherein the client network information service is further configured to:

automatically deliver the client network information to the application upon receiving a request from the application.

10. The system of claim 8, wherein the client network information indicates a domain name system of the originating network for the communication, a geographic location of the originating network, an organization of the originating network, and a network path of the communication.

11. The system of claim 8, wherein the injecting of the client network information causes the selection by modifying the header with an ordered list of possible application instances.

12. The system of claim 8, wherein the analyzing of the geographic data determines a forwarding distance of the communication.

13. The system of claim 8, wherein the client network information service is further configured to:

normalize the geographic data prior to the analyzing of the geographic data.

14. The system of claim 8, wherein at least one of the quality score, the security score, and the policy score is a weighted average of one or more factors.

15. A non-transitory computer-readable storage media encoded with software comprising computer executable instructions and when the software is executed operable to:

determine, at a computing apparatus, client network information for a communication from a client to at least one application running in a cloud infrastructure environment, wherein:

the client network information: is determined on a per-Internet Protocol address basis; includes a network status of an originating network for the communication and connectivity information related to the originating network and the communication; and includes one or more of: a quality score representing a quality of a connection associated with the communication, a security score representing any security issues related to the communication, and a policy score representing one or more policies associated with the application; and a determination of client network information comprises: analyzing geographic data obtained from at least one of: the at least one application, communications made via a Border Gateway Protocol (BGP) monitoring protocol, and third-party geo-coding data; and analyzing historical performance and quality of the communication based on past feedback from the application; and automatically deliver the client network information to instances of the application and to a router associated with the application by injecting the client network information into a header of packets associated with the communication as the communication is directed to the application, wherein the injecting causes selection of an instance of the application that provides service assurances.

16. The non-transitory computer-readable storage media of claim 15, wherein the instructions operable to automatically deliver the client network information are further operable to:

automatically deliver the client network information to the application upon receiving a request from the application.

17. The non-transitory computer-readable storage media of claim 15, wherein the client network information indicates a domain name system of the originating network for the communication, a geographic location of the originating network, an organization of the originating network, and a network path of the communication through the originating network.

18. The non-transitory computer-readable storage media of claim 15, wherein the injecting of the client network information causes the selection by modifying the header with an ordered list of possible application instances.

19. The non-transitory computer-readable storage media of claim 15, wherein the analyzing of the geographic data determines a forwarding distance of the communication and the instructions are further operable to:

normalize the geographic data prior to the analyzing of the geographic data.

20. The non-transitory computer-readable storage media of claim 15, wherein at least one of the quality score, the security score, and the policy score is a weighted average of one or more factors.

* * * * *